R. SIMON.

WOVEN SILK FABRIC.

No. 10,810. Reissued Feb. 22, 1887.

WITNESSES:

A. Schehl.

John M. Speer.

INVENTOR

Robert Simon.

BY Briesen & Steele

ATTORNEYS.

UNITED STATES PATENT OFFICE.

ROBERT SIMON, OF WEEHAWKEN, NEW JERSEY.

WOVEN SILK FABRIC.

SPECIFICATION forming part of Reissued Letters Patent No. 10,810, dated February 22, 1887.

Original No. 308,526, dated November 25, 1884. Application for reissue filed February 13, 1886. Serial No. 191,883.

DIVISION B.

*To all whom it may concern:*

Be it known that I, ROBERT SIMON, a resident of Weehawken, in the county of Hudson and State of New Jersey, have invented an Improved Woven Silk Fabric, of which the following is a full, clear, and exact description, reference being made to the accompanying drawings, in which—

Figure 1:
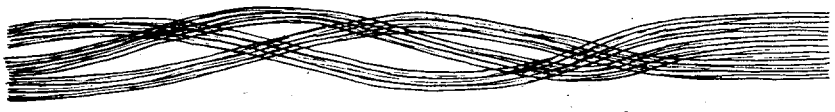
Figure 2:
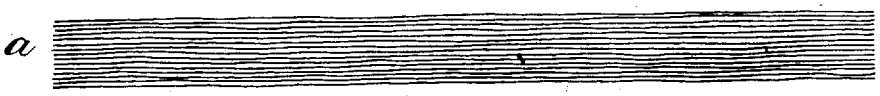
Figure 3:
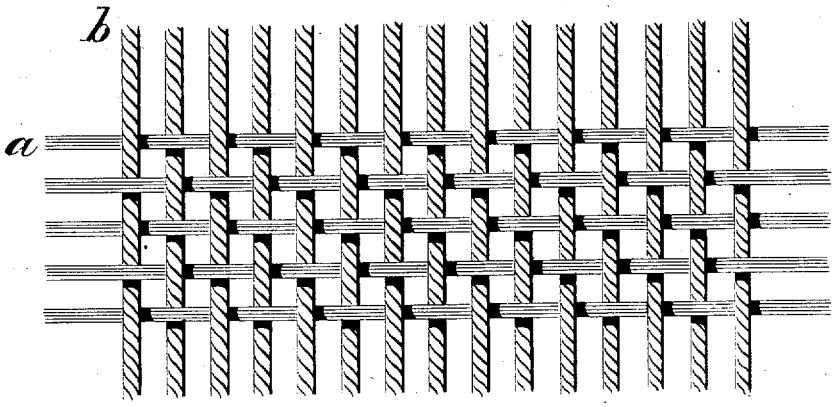

Figure 1 is a side view of a tram as used before my invention. Fig. 2 is a diagram of a tram which is used in my improved fabric. Fig. 3 is a face view of the fabric.

This invention relates to a new fabric which results from the employment of a tram that is produced by doubling a number of raw-silk threads, twisting these, dyeing the same, and untwisting said threads after dyeing. The tram thus produced is then wound on quills, which are placed in the loom-shuttles and used for the weft of the fabric. The improved fabric which results from the use of said tram possesses many important advantages over fabrics in which the tram or weft is composed of twisted threads of the ordinary kind.

In Figs. 2 and 3, the letters *a* represent the tram or weft of the fabric, and the letters *b* the warp.

The tram in my improved fabric is untwisted, lying in separate parallel or nearly parallel cocoon-threads, while in the ordinary fabric, as heretofore made, the cocoon-threads are reeled together into what is termed "raw-silk threads," each raw-silk thread containing a number of cocoon-threads; and two or more such raw-silk threads are first doubled and then twisted together, and make what is termed a "tram-thread," one or more of which constitute the shuttle-thread. Thus each weft in the fabric is composed of two or more tram-threads, of which each is composed of two or more raw-silk threads, and each raw-silk thread of two or more cocoon-threads.

In my improved fabric, as before stated, the tram is composed wholly of cocoon-threads that lie side by side and are not twisted.

The following specific advantages result from the use of this untwisted tram: First, the fabric has greater gloss, because the untwisted tram, wherever displayed to the eye, presents a more even surface than a twisted tram. Second, a fabric having this tram is not liable to break. It is one of the greatest objections to silk, especially when used for dresses, that it will break wherever folded. This I find is principally due to the fact that twisted trams or weft-threads are used, which of course, when bent sharply, are very liable to break, being unevenly strained, while, where the tram is made of untwisted threads lying side by side, each thread takes its own strain without affecting the others and is not broken by bending. Third, hence the improved fabric is more durable than a fabric having twisted weft-threads. Fourth, the fabric is more economically manufactured, because the labor of doubling the twisted threads upon the spool is dispensed with. Fifth, in manufacturing the fabric the batten meets with more elastic resistance from the weft-threads, and as a result the fabric is more even in thickness and softer to the touch.

Every loop formed by the warp is wholly filled by the weft, and this weft acts as a cushion against the batten, and also, when the fabric is finished, to pressure applied to the face thereof.

In practice I have found that the improved fabric has, as a matter of fact, all the advantages that are hereinabove specified and sundry others, and that, therefore, by the use of my invention improved results are attained.

It remains to state that in weaving the fabric any suitable loom may be employed, and the same process of weaving is made use of which is known or best adapted to making ordinary silk fabrics. The shuttle-threads or weft is thrown between the warp and the warp moved by its harness in the well-known manner of making fabrics.

What I claim is—

As a new article of manufacture, a silk fabric in which the trams *a a* are composed of untwisted cocoon-threads lying side by side, substantially as herein shown and described.

ROB. SIMON.

Witnesses:

CHAS. P. SCHNUERIGER,
JOHN CATON.